United States Patent
Wagstaff et al.

(10) Patent No.: US 9,533,386 B2
(45) Date of Patent: Jan. 3, 2017

(54) METHOD AND DEVICE FOR REMOVING A SLEEVE FROM A BORE

(75) Inventors: Lee Wagstaff, High Peaks (GB); Lee Bradbury, Bramhall (GB); Gareth Towlson, Chester (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 349 days.

(21) Appl. No.: 13/613,058

(22) Filed: Sep. 13, 2012

(65) Prior Publication Data

US 2013/0067746 A1    Mar. 21, 2013

(30) Foreign Application Priority Data

Sep. 21, 2011 (GB) .................................. 1116287.2

(51) Int. Cl.
| | |
|---|---|
| B23P 6/00 | (2006.01) |
| B23P 19/04 | (2006.01) |
| B23P 23/00 | (2006.01) |
| B23P 19/00 | (2006.01) |
| B23P 19/02 | (2006.01) |
| B23D 21/02 | (2006.01) |

(52) U.S. Cl.
CPC ............. *B23P 19/025* (2013.01); *B23D 21/02* (2013.01); *Y10T 29/49618* (2015.01); *Y10T 29/49622* (2015.01); *Y10T 29/49817* (2015.01); *Y10T 83/0304* (2015.04)

(58) Field of Classification Search
CPC .. B23P 19/025; B23D 21/02; Y10T 29/49618; Y10T 29/49817; Y10T 29/49622
USPC ......... 29/897.1, 426.1, 426.4, 426.5, 402.01, 29/402.03, 402.04, 402.05, 402.08, 29/402.09, 402.11, 402.19
See application file for complete search history.

(56) References Cited

U.S. PATENT DOCUMENTS

| | | | | |
|---|---|---|---|---|
| 2,411,246 | A | * | 11/1946 | Clapper .................... 29/890.031 |
| 3,613,212 | A | * | 10/1971 | Miller .............................. 29/726 |
| 3,659,482 | A | * | 5/1972 | Blake ............................ 408/1 R |
| 4,637,477 | A | * | 1/1987 | Jonsson .................... E21B 3/02 173/149 |
| 4,646,413 | A | * | 3/1987 | Nall et al. .................. 29/402.03 |
| 4,724,608 | A | * | 2/1988 | Parrott ............................. 29/724 |
| 4,736,806 | A | * | 4/1988 | Salmi ........................ E21B 6/00 173/104 |
| 4,924,588 | A | * | 5/1990 | Stignani et al. ................ 29/726 |

(Continued)

FOREIGN PATENT DOCUMENTS

| | | |
|---|---|---|
| CN | 101195215 A | 6/2008 |
| GB | 690 880 | 4/1953 |
| GB | 2 028 195 | 3/1980 |
| WO | 2008/021615 | 2/2008 |

OTHER PUBLICATIONS

UK Search Report for Application No. 1116287.2 mailed Jan. 20, 2012.

(Continued)

*Primary Examiner* — Essama Omgba
*Assistant Examiner* — Darrell C Ford
(74) *Attorney, Agent, or Firm* — Hauptman Ham, LLP

(57) ABSTRACT

A method of removing a metal sleeve from a bore formed in one or more elements is disclosed. The sleeve may be a cold-expanded sleeve secured within the bore by an interference fit. The method includes removing material from the internal surface of the sleeve by a cutter along a line to a depth less than the thickness of the sleeve, and subsequently urging the sleeve from the bore.

25 Claims, 9 Drawing Sheets

(56) References Cited

U.S. PATENT DOCUMENTS

| | | | |
|---|---|---|---|
| 4,997,321 A * | 3/1991 | Adams | 408/80 |
| 5,213,460 A * | 5/1993 | Sadri et al. | 411/43 |
| 6,036,418 A * | 3/2000 | Stencel et al. | 411/54.1 |
| 6,149,346 A * | 11/2000 | Takamatsu et al. | 405/156 |
| 6,511,267 B2 * | 1/2003 | Slaughter | 408/1 R |
| 6,524,031 B2 * | 2/2003 | Carter et al. | 405/184.3 |
| 7,093,360 B1 * | 8/2006 | Craig | 29/890.031 |
| 7,578,636 B2 * | 8/2009 | Tjader | 405/184.3 |
| 7,987,572 B2 * | 8/2011 | Badman et al. | 29/402.03 |
| 2002/0133928 A1 | 9/2002 | Scott et al. | |
| 2005/0112348 A1 * | 5/2005 | Schmidt et al. | 428/292.1 |
| 2005/0262688 A1 * | 12/2005 | Keiper | 29/857 |
| 2007/0180885 A1 * | 8/2007 | Johnson | 72/391.4 |
| 2008/0173457 A1 | 7/2008 | Kahra | |
| 2009/0285635 A1 * | 11/2009 | Tjader | 405/184.3 |
| 2010/0054884 A1 * | 3/2010 | Masuda | B23B 51/02 408/230 |
| 2010/0181115 A1 * | 7/2010 | Eddison | E21B 7/28 175/385 |
| 2010/0283333 A1 * | 11/2010 | Lemmers et al. | 310/54 |
| 2012/0228428 A1 * | 9/2012 | Deganis et al. | 244/129.3 |
| 2012/0288338 A1 * | 11/2012 | Cooper | 408/1 R |
| 2014/0238202 A1 * | 8/2014 | Roscosky et al. | 81/53.2 |
| 2014/0352122 A1 * | 12/2014 | Moors et al. | 29/402.08 |

OTHER PUBLICATIONS

Office Action issued in CN Application No. 201210353723.0 mailed Nov. 3, 2015.

* cited by examiner

METHOD AND DEVICE FOR REMOVING A SLEEVE FROM A BORE

RELATED APPLICATIONS

The present application is based on, and claims priority from, Great Britain Application Number 1116287.2, filed Sep. 21, 2011, the disclosure of which is hereby incorporated by reference herein in its entirety.

BACKGROUND OF THE INVENTION

The present invention concerns a method of removing a metal sleeve from a bore and to a device for the same. More particularly, but not exclusively, this invention concerns a method of removing a metal sleeve from a bore in an aircraft structure, the sleeve being secured within the bore by means of an interference fit, especially by means of a cold-worked sleeve-expansion method. The invention also concerns a method of replacing a fixing received within a sleeve and a device for removing a metal sleeve from a bore.

When fixing elements together with a bolt or other fixing that passes through a bore through the elements, particularly when the elements are made of differing materials, it is common to provide a sleeve, for example in the form of a bushing or a bearing arrangement, to line the bore within one or more of the elements. One method of securing the sleeve within the bore is to insert the sleeve in the bore and then cold expand the sleeve within the bore. Such a technique is utilised in the GromEx™ system provided by "FTI" (Fatigue Technology, Inc of Seattle, USA). Briefly, a sleeve received in a bore in a part is expanded by means of a hydraulic puller unit (for example the "Big Brute" Puller—Part No. 2720-008, also from FTI), which exerts a pulling force that pulls a mandrel through the sleeve, whilst the puller unit reacts at least some of the pulling force by means of a nose cap of the unit that butts against the surface of the part that defines the bore. A bolt may then be accommodated within the sleeve to fix the part to another element or part. In some cases, the bolt may form a friction fit or an interference fit with the sleeve.

If a bolt received in such a sleeve is damaged with consequent wear or damage to the sleeve then it is desirable to be able to remove the sleeve from the bore without causing damage to the surrounding material such that a replacement sleeve and bolt may be inserted into the bore. In some circumstances it is possible to remove both the bolt and sleeve simultaneously. In other cases, where the bolt and sleeve are more securely fitted in the bore, it may be better to remove the sleeve and bolt one at a time. In such cases, the bolt may often be readily removed by conventional pulling or pushing units that are able to exert sufficient forces (often in excess of 10 kN in some, for example aerospace, applications). The sleeve may then be removed, but the force required may prove to be higher, for example greater than 50 kN in some applications. It has been found that in certain circumstances the force required to remove a sleeve is too high to be practical to use the methods employed with existing equipment. Examples of such circumstances include, for example, attempting to remove long sleeves or attempting to remove sleeves that have been expanded in a bore that extends through multiple elements, each made from a different material having a different hardness.

The present invention seeks to mitigate the above-mentioned problem(s). Alternatively or additionally, the present invention seeks to provide an improved method of removing a metal sleeve from a bore, the sleeve being secured within the bore by means of an interference fit.

SUMMARY OF THE INVENTION

The present invention provides, according to a first aspect, a method of removing a metal sleeve from a bore, wherein the method comprises removing material from the internal surface of the sleeve by means of machining, preferably cutting, along a line, and subsequently urging the sleeve from the bore. The cutting along the line may be in the form of scribing along the line with a scribing tool. The method is of particular application when removing a sleeve from a bore in an aircraft structure, for example in a component either on an aircraft or for an aircraft.

The method is of particular application when the sleeve has been secured within the bore by means of an interference fit, for example by means of a cold-expansion of the sleeve within the bore. The step of removing material from of the internal surface of the sleeve may have the advantage of reducing the effectiveness of the interference fit and/or weakening the sleeve, facilitating its subsequent removal, without introducing any significant risk of damage to the surrounding material (that which defines the bore). Removing material from of the internal surface of the sleeve by machining, or cutting, along a line may also have an advantage of providing a relatively simple, quick and efficient way of easing removal of the sleeve. Such a method may be of particular application in the context of repair or maintenance of items utilising such bore-sleeve arrangements, such as for example, in the field of aircraft maintenance.

The removing of material from of the internal surface of the sleeve may cause deformation of the sleeve, thereby easing its removal from the bore. The deformation of the sleeve may result from a combination of the sleeve being weakened in the region of the cutting line and the action of compressive forces on the sleeve from the material that forms the bore. The deformation of the sleeve may alternatively or additionally result from internal stresses (for example residual stresses) in the sleeve.

Advantageously, the step of removing material from the internal surface of the sleeve is performed by means of cutting along the line to a depth no greater than, and preferably less than, the thickness of the sleeve. The step of removing material from the internal surface of the sleeve preferably includes cutting along a line to a depth of no greater than 90% of the thickness of the sleeve, more preferably no greater than 80%. Preferably, the step of removing of material from the sleeve does not involve cutting with a cutter that extends through the entire thickness of the sleeve. Cutting right through the sleeve may be disadvantageous where there is a desire to re-use the same bore without needing to repair the bore before such re-use. Preferably, the method does not include any step, between removing material from and removal of the sleeve from the bore, of cutting to a depth equal to or greater than the thickness of the sleeve.

The sleeve is preferably of one-piece construction. The sleeve will typically have two open ends. The sleeve will typically have a first end opposite in an axial direction to a second end.

The step of removing material from the internal surface of the sleeve may comprise a step of moving a cutting tool over the interior surface of the sleeve so as to cut a cutting line that extends from the first end to the second end of the sleeve. The cutting tool may be arranged to rotate as it cuts, thus creating a spiral cutting line. It is however preferred, for the sake of simplicity and reliability, to form a cutting line that is substantially parallel to the axis of the sleeve.

One cutting line may be sufficient to weaken the sleeve and/or its attachment to the bore. However it may be necessary to perform a plurality of steps of removing material from the internal surface of the sleeve, before urging the sleeve from the bore, for example to cut deeper into a cutting line already formed and/or to cut a plurality of discrete cutting lines into the sleeve. It is preferred not to remove material from the interior surface to an extent that would be considered as equivalent to cutting the sleeve out or reaming the sleeve out. Cutting, or reaming, the sleeve out would appear to risk damage to the bore and/or to be more time- and energy-consuming than might be necessary. In certain applications, the material in the region of the bore may be stressed and/or prone to damage and/or have a composition or configuration that would make even minor damage a serious matter and therefore difficult and/or expensive to remedy. As such, it is preferred that the sum distance cut (during performance of the method on a single sleeve) is less than the sum of 6 times the length of the sleeve plus 6 times the circumference of the sleeve. More preferably, the sum distance cut is less than the sum of 4 times the length of the sleeve plus 4 times the circumference of the sleeve.

The method may use more than one cutting tool. For example, a first cutting tool may be used in a first step of removing material from the sleeve, and a second, different, cutting tool may be used in a second step of removing material from the sleeve. The first cutting tool may be smaller (cutting to a shallower depth) than the second cutting tool. There may, in certain applications be advantage in using two different cutting tools that cut to substantially the same depth. The or each cutting tool is preferably arranged to cut to a single predetermined depth.

The method has particular application when the sleeve is a cold expanded sleeve. A cold expanded sleeve is a sleeve that has been fitted to a bore by means of expanding the sleeve in situ by a cold-working process. Such a process typically results in an interference fit between the sleeve and the bore. The method may include an initial step of installing the sleeve by means of such a cold-working sleeve-expanding process. The sleeve may have internal residual stresses, for example caused by a cold working process. The bore may have internal residual stresses, for example caused by such a cold working process. For example, such residual stresses in the material of the bore may act to compress the sleeve, against the force exerted by the sleeve radially outwards on the material defining the bore. Weakening the sleeve by removal of material from the sleeve may therefore cause failure in the sleeve under the action of such forces, thereby facilitating removal of the sleeve from the bore.

The bore may be defined by a plurality of different elements arranged in a stack. The bore may in such circumstances be considered as passing through each element. The different elements may be each made from different material. The present method has particular application in such circumstances because the degree of expansion of the sleeve, compression of the material forming the bore, and the subsequent relaxation of both the sleeve and the bore material will depend on the composition of the material defining the bore. In the case where different materials form different parts of the bore, the shape of the sleeve, and its interaction with the bore, may vary slightly along its length in dependence on the material defining the bore. Such variations along the length of the sleeve can make pushing out the sleeve (without the benefit of the present invention) more difficult requiring even higher, and less practicable, push-out loads. It may, for example, be the case that certain carbon-fibre reinforced plastic composite materials have a tendency to relax less than certain metal alloys. Thus, if a portion of a sleeve needs to be moved from a reasonably tight-fitting alloy region to a relatively tighter-fitting carbon-fibre reinforced plastic region, there will be an increase in the push-out force required, if not removing any material from the sleeve before attempting to remove the sleeve.

The sleeve may have a length longer than 50 mm. The sleeve preferably has a length longer than 75 mm. The sleeve may have a length longer than 100 mm. The diameter of the sleeve may be wider than 15 mm. The diameter of the sleeve is preferably wider than 20 mm. The diameter of the sleeve may be wider than 25 mm. The method of the invention may be of greater application, the higher the surface area of contact between the sleeve and the bore. The thickness of the sleeve may be between 0.5 mm and 5 mm.

The step of removing material from the internal surface of the sleeve is preferably performed by means of a device which exerts a pulling force that pulls a cutting tool through the bore and towards a first end of the bore, whilst the device reacts at least some of the pulling force by means of a support structure of the device that butts against the material defining the bore at the first end of the bore.

The speed at which the cutting progresses along the line is preferably less than 10 ms$^{-1}$, more preferably less than 5 ms$^{-1}$, and may be less than 1 ms$^{-1}$. A low travel speed of the cutting facilitates better control of the cutting and reduced the risk of damage.

According to a second aspect of the invention there is also provided a method of replacing a fixing received within a sleeve including a step of removing the sleeve from the bore by performing a method in accordance with the invention of the first aspect of the invention as described or claimed herein. The method of the second aspect of the invention may comprise the steps of providing a structure having a bore in which a metal sleeve is secured by means of an interference fit, the sleeve accommodating a fixing therethrough, removing the fixing from the sleeve, removing the sleeve, fitting a replacement sleeve within the bore, and then fitting a fixing within the sleeve. The fixing fitted in the replacement sleeve may be a replacement fixing. The fixing may be in the form of a bolt. The fixing may be received in a bore of an aircraft pylon structure. The step of fitting the replacement sleeve within the bore may be performed by means of cold-expanding the sleeve within the bore. The cold-expanding of the sleeve within the bore may be performed by means of a device. The same device may also be used in the step of removing material from the internal surface of the sleeve during the method of removing the sleeve. The method may be performed as part of a maintenance or repair procedure, for example on an aircraft structure, whether on or separate from an aircraft.

According to a third aspect of the invention there is further provided a device for use in performing the method of the invention in accordance with the first or second aspects of the invention as described or claimed herein. The device preferably includes a cutting tool. The cutting tool is preferably removably mounted on a shaft. The cutting tool may be part of a cutting head, removably mounted on the shaft. The shaft of the device is preferably arranged to exert a longitudinal force in the direction of the shaft of at least 10 kN. The device is preferably able to exert of longitudinal force, preferably a pulling force, of at least 50 kN. The device may form one part of a tool kit (or kit of parts) for performing the method of the invention. The device may for example be provided with two or more cutting heads or cutting tools. The or each cutting head may in include a swarf rebate. The shaft may include, or be attached to, an adaptor portion to allow the shaft to connect to an existing load generating (e.g. hydraulic puller unit) apparatus.

It will of course be appreciated that features described in relation to one aspect of the present invention may be incorporated into other aspects of the present invention. For example, the method of the invention may incorporate any of the features described with reference to the apparatus of the invention and vice versa. By way of example, the device (of the apparatus of the invention) may include a support structure, such as a nose cap or the like, for butting against the material defining the bore at the first end of the bore to react a pulling load.

DESCRIPTION OF THE DRAWINGS

Embodiments of the present invention will now be described by way of example only with reference to the accompanying schematic drawings of which.

DETAILED DESCRIPTION

Figure 1:
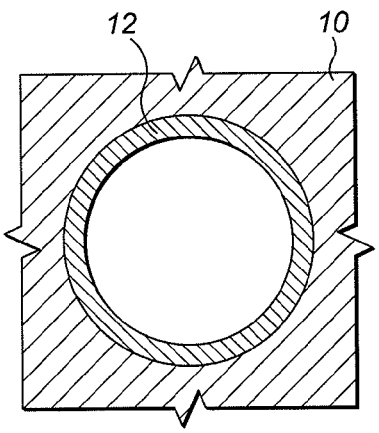
FIG. 1 shows a sleeve in a bore.

FIG. 1 shows an aircraft structure 10 in which a bore has been formed. Inside the bore there is a cold-expanded austenitic stainless steel sleeve 12 that is fixed in the bore by means of an interference fit. The interference fit is produced by means of a tool that inserts a non-expanded sleeve into the bore and then cold-works the metal by expanding it, thereby increasing both its internal and external diameter. An example of such a cold-worked sleeve system is the provided by Fatigue Technology, Inc of 401 Andover Park East, Seattle, USA under the trade mark "Grom-Ex". Such sleeves are used to provide a bushing for receiving a bolt or other fixing means. A sleeve may be fitted in the bore by means of expanding the sleeve using a hydraulic puller unit, which exerts a pulling force that pulls a mandrel of increasing diameter through the sleeve, thus expanding the sleeve.

One application of such a sleeve system is to provide a means of attaching a pylon structure to the wing structure of an aircraft whilst also providing a means of enhancing lightning strike protection in composite, or part composite, wing structures. In this embodiment, the sleeve has a length of about 100 mm and a diameter of about 25 mm. The thickness of the sleeve is about 1 mm.

Figure 2:
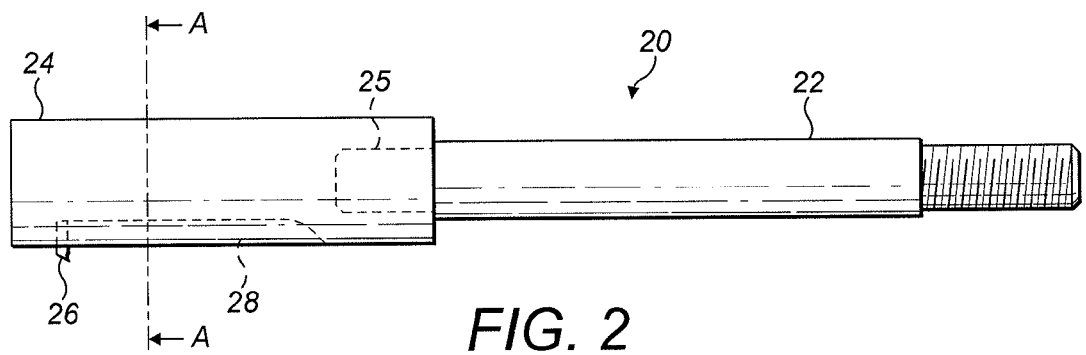
FIG. 2 shows in cross-section a sleeve removal device comprising a head and a shaft according to a first embodiment of the invention.

FIG. 2 shows a sleeve removal device 20, in accordance with a first embodiment of the present invention, for removing the cold-expanded metal sleeve 12 from the aircraft structure 10. The device 20 comprises a shaft 22 on which there is mounted a head 24 by means of a screw fitting 25 (an M12 course thread). The head 24 includes a cutting tool bit 26 adjacent to a swarf collection rebate 28 in the head. Both the head 24 and the shaft 22 are made from "Type 303" stainless steel (as defined by the Society of Automotive Engineers—SAE). The cutting tool bit 26 is in the form of a carbide metal 35 degree rhombic double-sided turning insert coated with titanium aluminium nitride (TiAlN), such as Iscar's "VNMG 12T304-NF INSERT GRADE IC907" insert available from Cromwell Tools Limited of 65 Chartwell Drive, Wigston, Leicester LE18 1AT.

Figure 3A:
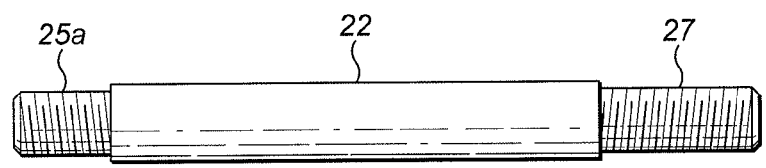
FIG. 3a shows in cross-section the shaft of the device of the first embodiment.
Figure 3B:
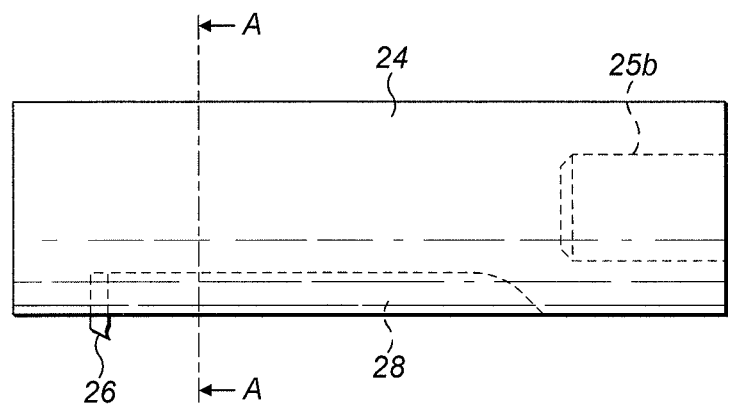
FIG. 3b shows in cross-section the head of the device of the first embodiment.

FIGS. 3a and 3b show, respectively, the shaft 22 and head 24 separated from each other. With reference to FIG. 3a, the shaft 22 includes a male threaded front end 25a for attachment of the head. The shaft 22 also includes at its other end and adaptor element 27 for attaching to a pneumatic pulling tool. The length of the shaft shown in FIG. 3a is about 250 mm.

With reference to FIG. 3b, the head 24 includes a female screw fitting 25b for facilitating attachment of the head to the corresponding male fitting 25a on the shaft 22. The outer diameter of the head 24 is substantially equal to the inner diameter of the sleeve 12, such that there is little in the way of play as between the head 24 and sleeve 12 when the head 24 is inserted into the sleeve 12. The head is about 100 mm long.

Figure 3C:
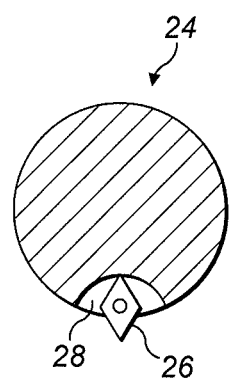
FIG. 3c is a sectional view of the head from the section shown by the line A-A in FIG. 3b.
Figure 4:
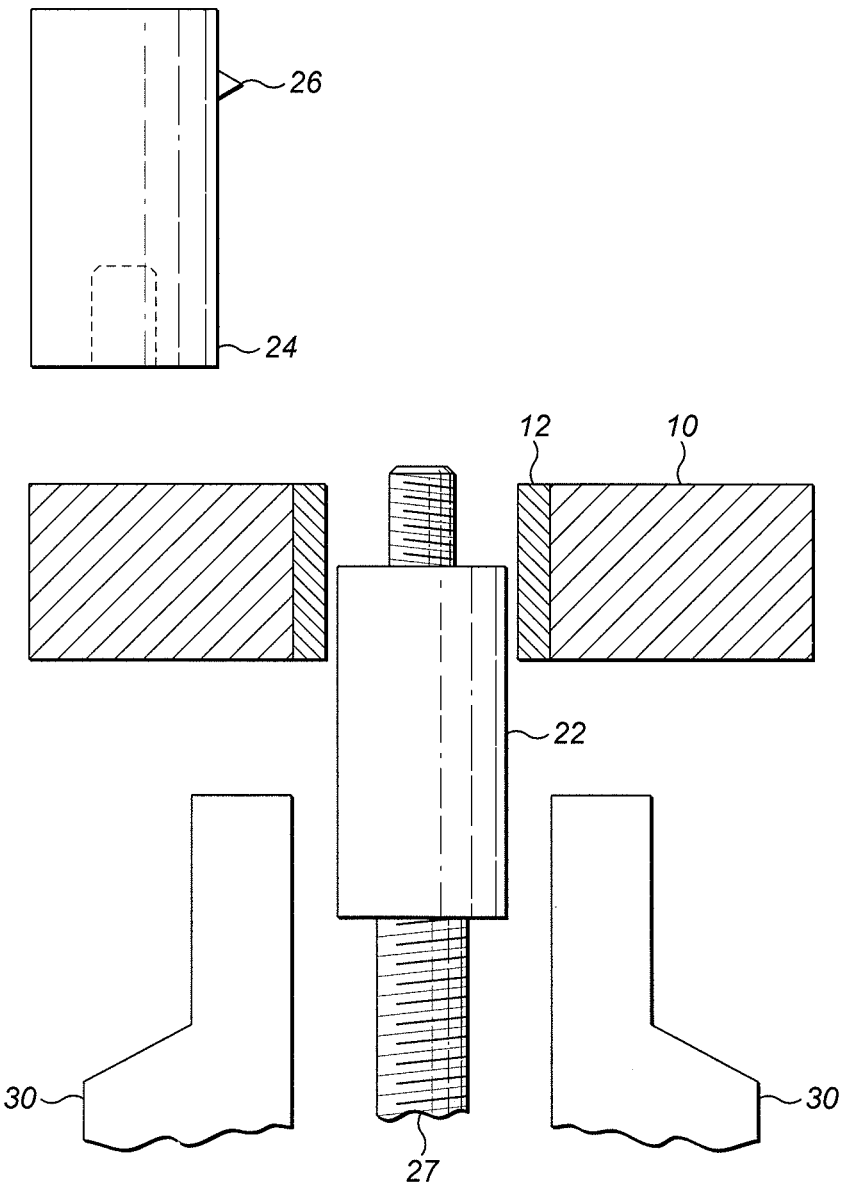
FIG. 4 is a sectional view illustrating a first step of a method of using a sleeve removal device in accordance with the first embodiment.
Figure 5:
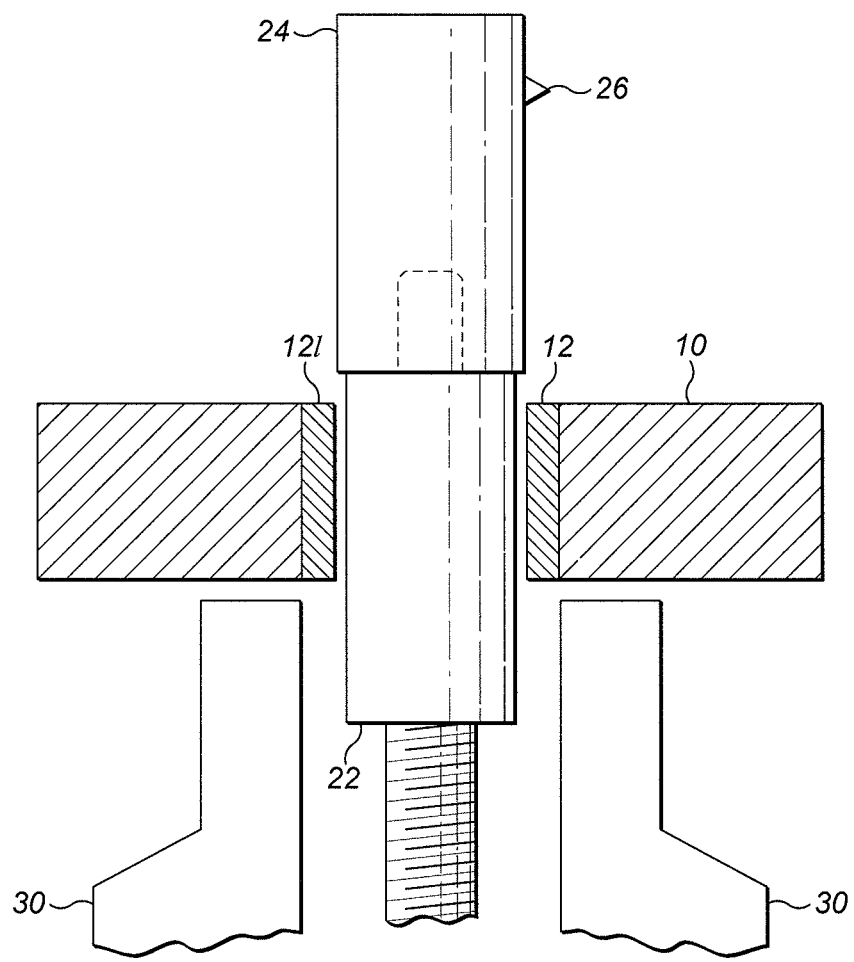
FIG. 5 is a sectional view illustrating a second step of the method of using a sleeve removal device in accordance with the first embodiment.
Figure 6:
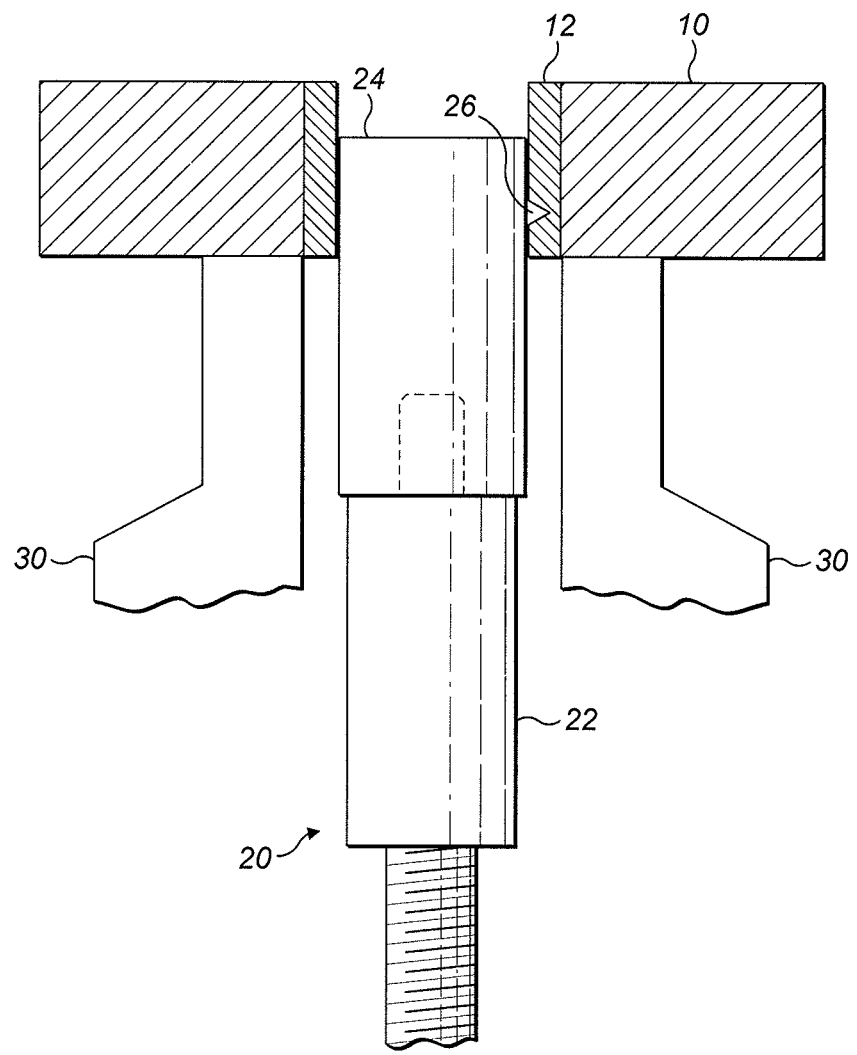
FIG. 6 is a sectional view illustrating a third step of a method of using a sleeve removal device in accordance with the first embodiment.

FIG. 3c is a cross-sectional view of the head 24 taken about the plane A-A as shown in FIG. 3b. The cross-section view shown shows the head's cutting bit 26 which is securely fastened to the head 24.

Figure 7:
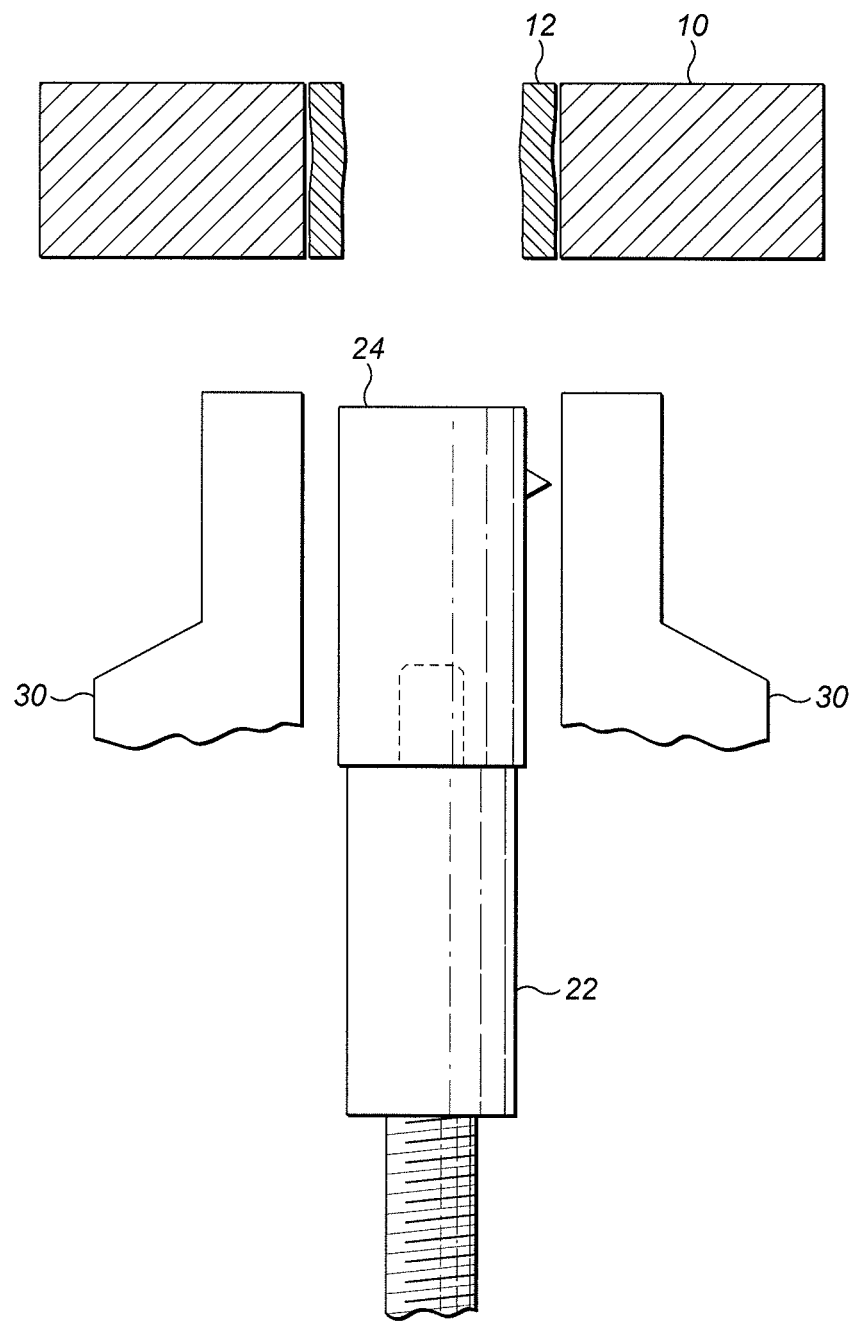
FIG. 7 is a sectional view illustrating a fourth step of a method of using a sleeve removal device in accordance with the first embodiment.
Figure 8:
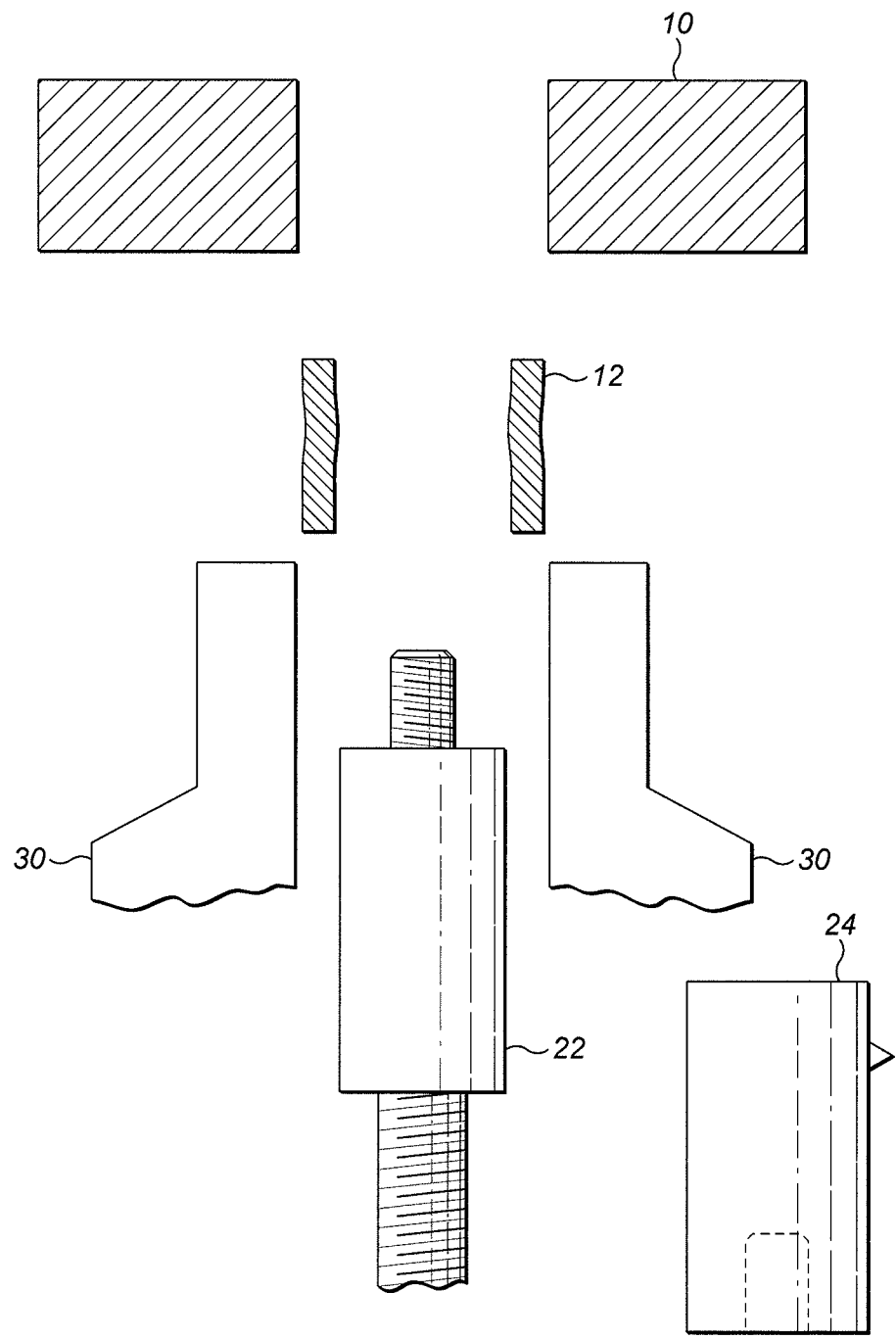
FIG. 8 is a sectional view illustrating a fifth step of a method of using a sleeve removal device in accordance with the first embodiment.

Use of the sleeve removal device 20 in accordance with the first embodiment will now be described with reference to FIGS. 4 to 8, which show, as schematic cross-sections, the steps of a method for removing a cold-worked sleeve 12 fitted in a bore defined by an aircraft component 10. The aircraft component in this case is a pylon fitting such that the space above the component 10 is the interior of a fuel tank, whereas the space below the component 10 is a region below the underside of an aircraft wing A first operator (not shown in the Figs) is located below the sleeve 12 and a second operator (not shown in the Figs) is located above the sleeve 12 within the fuel tank space (emptied for the sake of maintenance). The shaft 22 of the device 20 is attached via the adaptor 27 to a hydraulic puller unit (the nose cap 30 of which only being shown in the Figures) in the form of a Big Brute Puller (Part No. 2720-008, from FTI). The shaft 22 is then offered up through the sleeve 12 into the aircraft tank aperture by the first operator (see FIG. 4). The second operator then screws the head 24 of the tool onto the shaft 22 (see FIG. 5) and positions it onto the edge of the lip 12l of the sleeve 12. The first operator then positions and configures the puller unit, such that the head 24 remains on the lip of the sleeve 12 whilst the nose cap 30 of the puller unit engages the underside of the component 10 and sleeve 12. The puller unit is then activated such that the shaft 22 and head 24 (and therefore cutting tool bit 26) are pulled down through the sleeve 12, with the cutting tool bit 26 being drawn over the interior surface of the sleeve 12 (see FIG. 6). The cutting bit 26 thus cuts a longitudinal groove into the sidewall of the sleeve 12 thus weakening it. The groove cut is about 0.5 mm deep. The waste material (the swarf) removed from the sleeve collects in the swarf collection rebate 28. The puller unit is then removed from the underside of the component 10 as shown in FIG. 7. The thus structurally weakened sleeve 12 deforms, as a result of compressive forces on the sleeve from the component 10, and partially collapses (as shown schematically in FIG. 7) thus facilitating its removal. The collapsed sleeve 12 may then be pushed out manually using either hand force and a nylon mandrel or a light jacking force again by hand and in-situ underneath the component 10 (see FIG. 8). The head 24 may then be removed in preparation for repeating the method to remove a further sleeve from a different bore.

Figure 9:
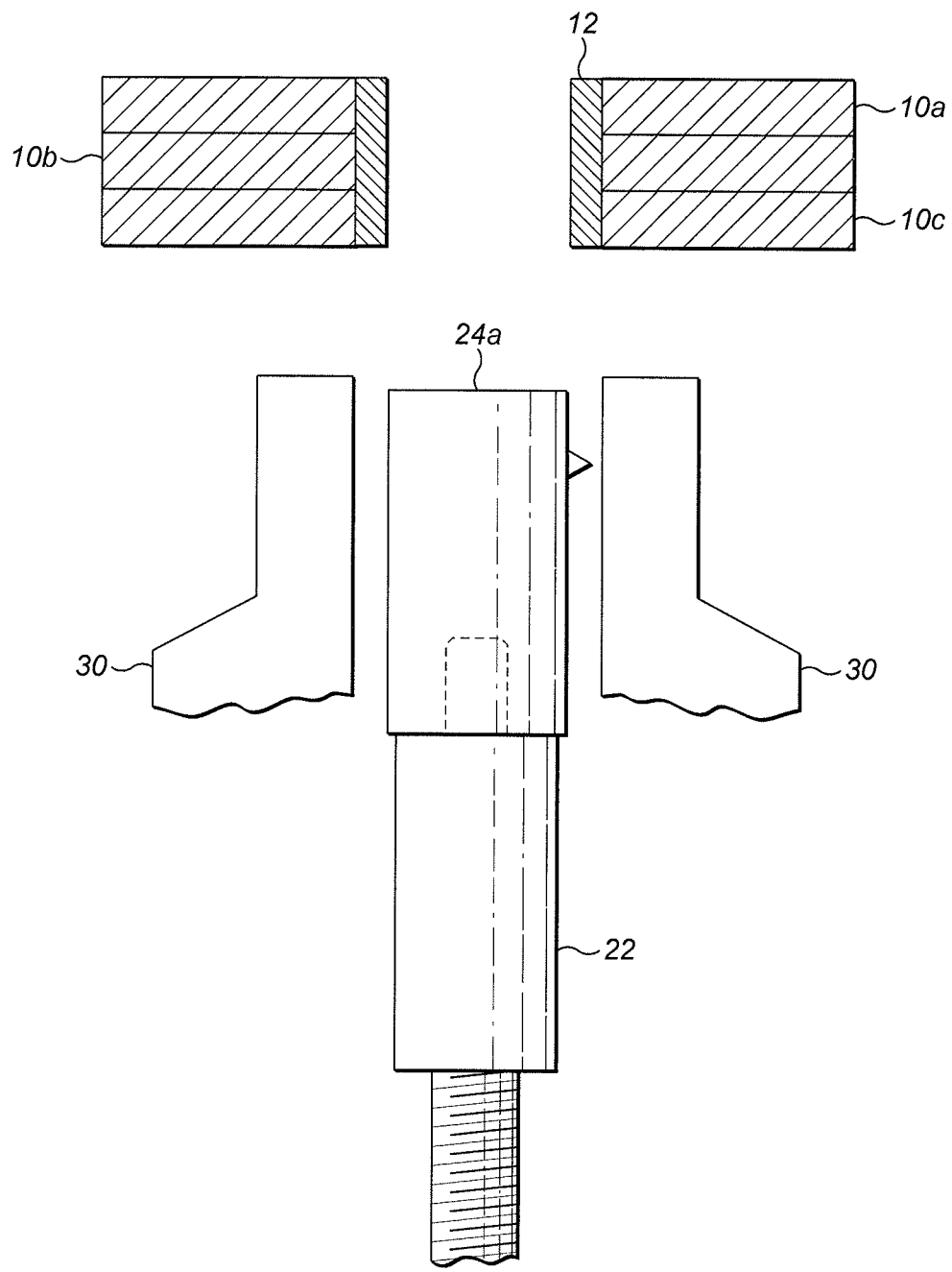
FIG. 9 illustrates a first step of a sleeve removal method of a second embodiment.
Figure 10:
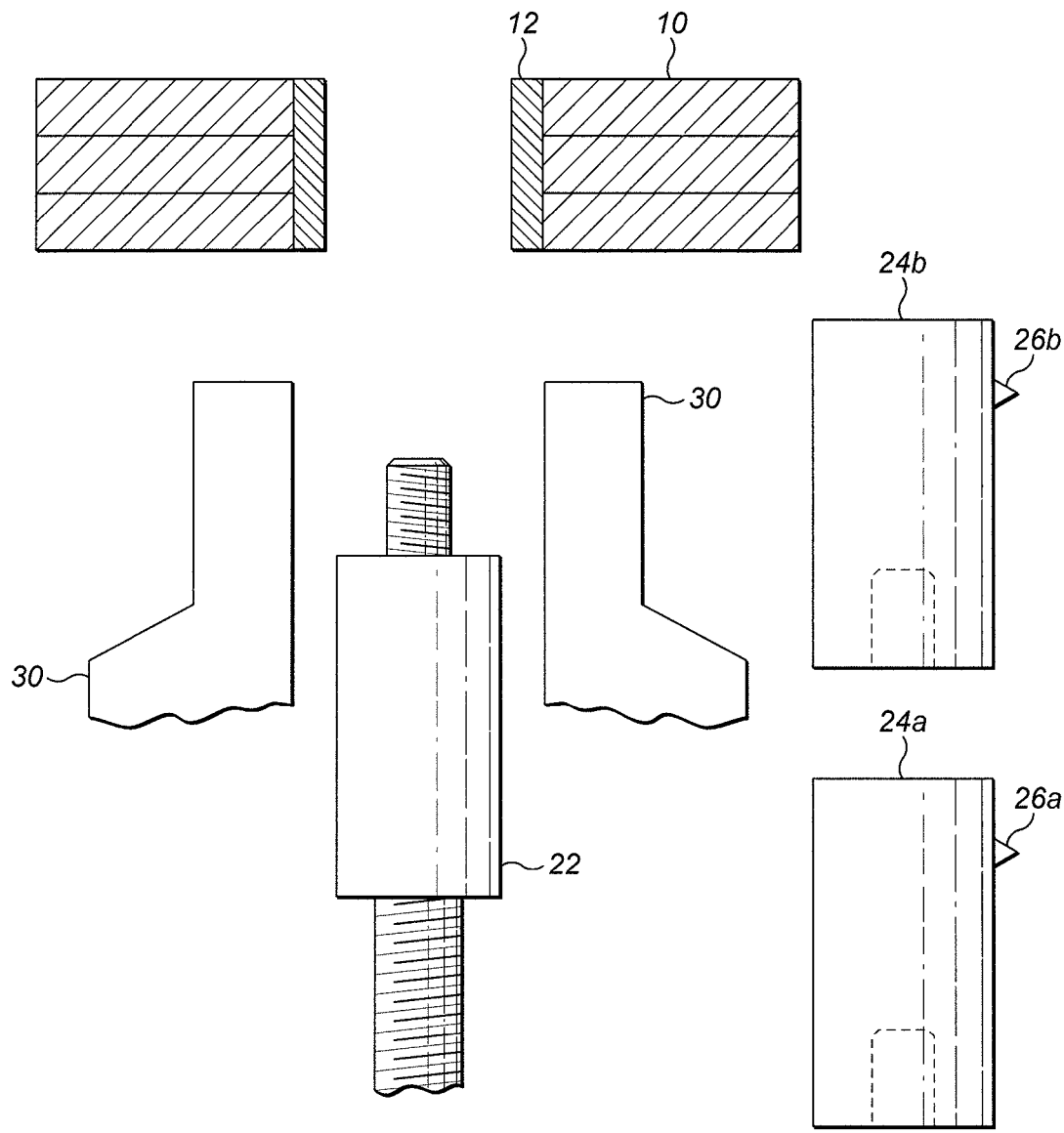
FIG. 10 illustrates a second step of the sleeve removal method of the second embodiment.

FIGS. 9 and 10 illustrate a method of removing a sleeve in accordance with a second embodiment. In this case, the component 10 (see FIG. 9) is in the form of a stack comprising three separate elements, namely a top Titanium layer 10a (the pylon structure), a middle CFRP layer 10b (wing cover), and a bottom Aluminium alloy layer 10c (load spreader). The stack has a thickness of about 165 mm. The sleeve accommodated with the bore in the stack has a diameter of about 32 mm, a length of about 165 mm, and a wall thickness of about 1 mm. As a result of the different structural properties of the different materials of the elements forming the stack, the sleeve interacts differently with each element, which makes its removal from the bore more difficult. Without first cutting the sleeve it is likely that a force of greater than 250 kN would be required in order to remove the sleeve by force alone. The method according to the second embodiment thus requires several longitudinal grooves to be cut along the length of the sleeve 12 down to a depth of about 0.75 mm (i.e. 75% of the depth of the sleeve).

The cutting of the first groove (to a depth of 0.5 mm) is performed, with the use of a first cutting head 24a with a cutting bit 26a configured to cut a groove down to a depth of 0.5 mm, in much the same way as described above with reference to FIGS. 4 to 7. Then (i.e. from the position shown in FIG. 9) the process is repeated such that the first groove is machined again to deepen the groove. For this purpose, the first cutting head 24a is replaced with a second cutting head 24b configured to cut a groove down to a depth of 0.75 mm, as shown schematically in FIG. 10. Thus, the first operator unscrews the first head 24a and offers the shaft 22 back up through the sleeve 12. The second head 24b is then attached to the shaft 22 by the second operator and then drawn down through the sleeve, cutting the deeper groove along its path. The process is then repeated at a plurality of circumferentially spaced apart positions around the sleeve, so as to create a plurality of longitudinally machined grooves in the sleeve. The sleeve once weakened in this way is readily deformed and pushed out with a longitudinal force of less than 100 kN. A hydraulic tool may still however be required to assist with ejection of the sleeve.

In a third embodiment, not separately illustrated, two lines are cut longitudinally down the length of the sleeve, the lines being opposite each other (i.e. spaced apart by about 180 degrees around the sleeve). In the third embodiment, the second operator has in his possession at the start of the process two cutting heads both configured to cut to the same depth. (The cutting heads may be substantially identical.) The first operator need not then be required to pass to the second operator any cutting heads during removal of a single sleeve. One or both of the operators are however required to ensure that the cutting bit of the second head cuts a groove at a position generally opposite to the groove cut by the first head.

The first, second and third embodiments all involve the selective removal of material from the internal surface of the sleeve by means of cutting along a line to a pre-selected depth and in a controlled manner. The embodiments thus provide a means of removing a cold-expanded sleeve from a bore in a controlled, simple and efficient manner.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The depth of the groove cut in the sleeve may in certain applications need to extend to close to the full thickness of the sleeve.

The cutting of grooves may comprise creating multiple lines (e.g. three or more) of material removed from the interior surface of the groove, each line being machined only once.

The second embodiment may comprise cutting all the lines to a given depth before proceeding to cut, if necessary in relation to the sleeve being machined, to a deeper depth.

The lines cut need not be parallel to the axis of the sleeve.

It will be readily appreciated that different dimensions and geometries of sleeves and cutting tools may be employed and that materials may vary, depending on the application.

The sleeves need not be ones used in an aerospace or aviation application.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of removing a metal sleeve from a bore, wherein the bore is in the form of a bore in an aircraft structure, the sleeve has a wall that extends between an inner surface of the sleeve and an outer surface of the sleeve, the wall having a thickness, and the sleeve is secured within the bore by means of an interference fit, and wherein the method comprises the following steps:

providing a scribing tool comprising a shaft having a first end and a second end, a cutting tool bit, a head mounted to the shaft at the first end, the cutting tool bit projecting radially outward from the head, and a recess in the head associated with the cutting tool bit such that the tool bit is anchored in the recess, causing the sleeve to partially collapse as a result of compressive forces on the sleeve from the aircraft structure by means of cutting along a cutting line into the inner surface of the sleeve, wherein the cutting includes removing material from the inner surface of the sleeve by cutting along the line to a depth less than the thickness of the wall of the sleeve with the cutting tool bit, thus forming a cutting line scribed into the internal surface of the sleeve, and subsequently urging the sleeve from the bore.

2. A method according to claim 1, wherein the sleeve has a first end opposite in an axial direction to a second end, and the step of removing material from the internal surface of the sleeve comprises a step of moving a cutting tool over the interior surface of the sleeve so that said cutting line extends from the first end to the second end of the sleeve.

3. A method according to claim 2, wherein the sleeve has an axis and said cutting line is substantially parallel to the axis of the sleeve.

4. A method according to claim 1, wherein the method includes performing a plurality of steps of removing material from the internal surface of the sleeve, before performing the step of urging the sleeve from the bore.

5. A method according to claim 4, wherein the plurality of steps of removing material from the internal surface of the sleeve includes a first step of cutting along said cutting line and a second step of cutting deeper into the same cutting line.

6. A method according to claim 5, wherein the first step of forming a cutting line is performed using a first cutting tool, and the second step of forming the deeper cutting line is performed using a second, different, cutting tool.

7. A method according to claim 4, wherein the plurality of steps of removing material from the internal surface of the sleeve are performed such that a plurality of discrete cutting lines are formed in the sleeve.

8. A method according to claim 1, wherein the sleeve is a cold expanded sleeve.

9. A method according to claim 1, wherein the bore is defined by a plurality of different elements arranged in a stack, the bore passing through each element, and the different elements are each made from different material.

10. A method according to claim 1, wherein the sleeve has a length longer than 50 mm, and a diameter wider than 15 mm.

11. A method according to claim 1, wherein the step of removing material from the internal surface of the sleeve is performed by means of a device which exerts a pulling force that pulls the cutting tool through the bore and towards a first end of the bore whilst the device reacts to at least some of the pulling force by means of a support structure of the device that butts against the material defining the bore at the first end of the bore.

12. A method of replacing a fixing received within a sleeve, wherein the method comprises the steps of:
providing a structure having a bore in which a metal sleeve is secured by means of an interference fit, the sleeve accommodating said fixing therethrough,
removing the fixing from the sleeve,
removing the sleeve from the bore by performing a method in accordance with claim 1,
fitting a replacement sleeve within the bore, and
fitting a fixing, being either a replacement fixing or the same fixing as so removed, within the replacement sleeve.

13. A method of replacing a fixing according to claim 12, wherein the step of fitting the replacement sleeve within the bore is performed by means of cold-expanding the sleeve within the bore with the device.

14. A method of replacing a fixing according to claim 12, wherein the fixing is a bolt received in a bore of an aircraft pylon structure and the method is performed as part of a maintenance or repair procedure.

15. A method according to claim 1, wherein the speed at which the cutting progresses along the line is less than 10 $ms^{-1}$.

16. A method according to claim 1, wherein the scribing tool comprises a cutting tool bit mounted on the end of a shaft, which during the step of cutting along the line is arranged parallel to the axis of the bore, and wherein during the step of cutting along the line the shaft withstands a longitudinal load in the direction of the shaft of at least 10 kN.

17. A method according to claim 1, wherein the cutting tool bit is associated with a swarf rebate and the method includes collecting, in the swarf rebate, swarf created when removing material from the inner surface of the sleeve.

18. A method according to claim 1, wherein the recess is acting as a swarf collection rebate and at least some of the material being collected within the swarf collection rebate.

19. A method of removing a metal sleeve from a cylindrical bore,
wherein the cylindrical bore has a diameter, has a length which extends in a lengthwise direction and is located in an aircraft structure,
the sleeve is secured within the cylindrical bore by means of an interference fit, and
the method comprises the following steps:
providing a scribing tool comprising a shaft having a first end and a second end, a cutting tool bit, a head mounted to the shaft at the first end, the cutting tool bit projecting radially outward from the head, and a recess in the head associated with the cutting tool bit such that the tool bit is anchored in the recess,
removing material from the internal surface of the sleeve by means of using the cutting tool bit to scribe along a line to a depth less than a thickness of the sleeve, and
subsequently urging the sleeve from the cylindrical bore, and further wherein
the sleeve includes a generally cylindrical section having a fixed inner diameter and a fixed outer diameter, the thickness of the sleeve wall in a radial direction being equal to one half of the difference between the outer diameter and the inner diameter,
the generally cylindrical section of the sleeve has a first end opposite in an axial direction to a second end,
the step of removing material from the internal surface of the sleeve comprises a step of moving the cutting tool bit over the interior surface of the sleeve so that the line scribed extends from the first end of the sleeve in the lengthwise direction towards the second end of the sleeve and so that, along the length of the scribed line, the depth to which the cutting tool bit cuts is no greater than 90% of the thickness of the wall of the sleeve.

20. A method of removing a metal sleeve from a bore, wherein the bore is in the form of a bore in an aircraft structure,
the sleeve has a wall that extends between an inner surface of the sleeve of the sleeve and an outer surface of the sleeve, the wall having a thickness, and
the sleeve is secured within bore by means of an interference fit, and wherein the method comprises the following steps:

providing a scribing tool comprising a shaft having a first end and a second end, a cutting tool bit, a head mounted to the shaft at the first end, the cutting tool bit projecting radially outward from the head, and a recess in the head associated with the cutting tool bit such that the tool bit is anchored in the recess, causing the sleeve to partially collapse as a result of compressive forces on the sleeve from the aircraft structure by means of cutting along a cutting line that is substantially parallel to the axis of the sleeve into the internal surface of the sleeve, the cutting including removing material from the inner surface of the sleeve by cutting along the line to a depth less than the thickness of the wall of the sleeve, thus forming a cutting line scribed into the internal surface of the sleeve, and subsequently urging the sleeve from the bore.

21. A method according to claim 20, wherein the step of cutting along the cutting line forms a single discrete cutting line in the sleeve.

22. A method according to claim 21, wherein the method includes performing a further step of cutting deeper into the same cutting line.

23. A method according to claim 21, wherein the method includes performing further steps of cutting along further cutting lines, each being discrete and substantially parallel to the axis of the sleeve.

24. A method according to claim 20, the recess acting as a swarf collection rebate.

25. A method according to claim 24, wherein at least a portion of the cutting tool bit is located within said recess.

* * * * *